(12) United States Patent
Yun et al.

(10) Patent No.: US 12,155,087 B2
(45) Date of Patent: Nov. 26, 2024

(54) SEPARATOR FOR ELECTROCHEMICAL DEVICE AND ELECTROCHEMICAL DEVICE COMPRISING THE SAME

(71) Applicant: LG ENERGY SOLUTION, LTD., Seoul (KR)

(72) Inventors: Hyun-Woong Yun, Daejeon (KR); Jong-Keon Yoon, Daejeon (KR); Hoe-Jin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 691 days.

(21) Appl. No.: 17/414,498

(22) PCT Filed: May 14, 2020

(86) PCT No.: PCT/KR2020/006359
§ 371 (c)(1),
(2) Date: Jun. 16, 2021

(87) PCT Pub. No.: WO2020/235863
PCT Pub. Date: Nov. 26, 2020

(65) Prior Publication Data
US 2022/0069416 A1 Mar. 3, 2022

(30) Foreign Application Priority Data

May 17, 2019 (KR) .......................... 10-2019-0057654

(51) Int. Cl.
| | | |
|---|---|---|
| H01M 50/446 | (2021.01) | |
| C08F 214/26 | (2006.01) | |
| C08F 216/14 | (2006.01) | |
| C08J 7/04 | (2020.01) | |
| C08J 7/044 | (2020.01) | |
| C08J 9/36 | (2006.01) | |
| C08K 3/22 | (2006.01) | |
| C09D 5/24 | (2006.01) | |
| C09D 7/61 | (2018.01) | |
| C09D 127/18 | (2006.01) | |
| C09D 127/22 | (2006.01) | |
| C09D 129/10 | (2006.01) | |
| H01M 10/052 | (2010.01) | |
| H01M 50/417 | (2021.01) | |
| H01M 50/426 | (2021.01) | |
| H01M 50/443 | (2021.01) | |
| H01M 50/449 | (2021.01) | |
| H01M 50/451 | (2021.01) | |
| H01M 50/489 | (2021.01) | |
| H01M 50/491 | (2021.01) | |
| H01M 50/497 | (2021.01) | |

(52) U.S. Cl.
CPC .......... *H01M 50/446* (2021.01); *C08J 9/365* (2013.01); *C09D 5/24* (2013.01); *C09D 7/61* (2018.01); *C09D 127/22* (2013.01); *H01M 10/052* (2013.01); *H01M 50/426* (2021.01); *H01M 50/443* (2021.01); *H01M 50/449* (2021.01); *H01M 50/491* (2021.01); *C08J 2323/06* (2013.01); *C08J 2327/22* (2013.01); *H01M 50/489* (2021.01)

(58) Field of Classification Search
USPC ....................................................... 429/145
See application file for complete search history.

(56) References Cited

U.S. PATENT DOCUMENTS

| | | | | |
|---|---|---|---|---|
| 2005/0233221 | A1* | 10/2005 | Araki ..................... | H01B 1/122 429/316 |
| 2006/0034035 | A1* | 2/2006 | Maruo ................... | H01G 11/22 361/502 |
| 2011/0027658 | A1* | 2/2011 | Kim ..................... | H01M 50/434 427/508 |
| 2013/0313468 | A1* | 11/2013 | Nakamura .............. | C08L 77/12 524/436 |
| 2014/0057155 | A1 | 2/2014 | Kim et al. | |
| 2014/0377887 | A1 | 12/2014 | Miyake et al. | |
| 2015/0140404 | A1 | 6/2015 | Yoo et al. | |

(Continued)

FOREIGN PATENT DOCUMENTS

| | | | | |
|---|---|---|---|---|
| CN | 101777657 | A * | 7/2010 | |
| CN | 107068948 | A * | 8/2017 | .......... H01M 50/403 |

(Continued)

OTHER PUBLICATIONS

International Search Report (PCT/ISA/210) issued in PCT/KR2020/006359 mailed on Aug. 21, 2020.

(Continued)

*Primary Examiner* — Christian Roldan
*Assistant Examiner* — Robert Gene West
(74) *Attorney, Agent, or Firm* — Birch, Stewart, Kolasch & Birch, LLP

(57) ABSTRACT

A separator for an electrochemical device comprising a porous polymer substrate, and a porous coating layer on at least one surface of the porous polymer substrate. The porous coating layer comprises inorganic particles and an ion conducting polymer. The ion conducting polymer comprises a fluorine-based copolymer comprising fluoroolefin-based segments with anionic functional groups present in side chains or terminals, and an electrochemical device comprising the same. It is possible to provide a separator with high ionic conductivity and an increased peel strength between the porous polymer substrate and the porous coating layer, and an electrochemical device with improved properties.

13 Claims, No Drawings

(56) References Cited

U.S. PATENT DOCUMENTS

| | | | |
|---|---|---|---|
| 2015/0162587 A1* | 6/2015 | Yoon | H01M 50/451 |
| | | | 427/121 |
| 2017/0331150 A1* | 11/2017 | Park | H01M 4/625 |
| 2018/0006307 A1 | 1/2018 | Song et al. | |
| 2018/0047962 A1* | 2/2018 | Honda | C09J 7/26 |
| 2018/0342736 A1* | 11/2018 | Matsushita | H01M 4/667 |
| 2019/0358589 A1 | 11/2019 | Lu et al. | |
| 2019/0379021 A1* | 12/2019 | He | H01M 4/623 |

FOREIGN PATENT DOCUMENTS

| | | | |
|---|---|---|---|
| CN | 108295662 A | | 7/2018 |
| EP | 3 678 220 A1 | | 7/2020 |
| JP | 2005-293891 A | | 10/2005 |
| JP | 2016-7816 A | | 1/2016 |
| JP | 2018-506155 A | | 3/2018 |
| KR | 10-2003-0059931 A | | 7/2003 |
| KR | 10-2009-0102452 A | | 9/2009 |
| KR | 20100113030 A | * | 10/2010 |
| KR | 10-2011-0011932 A | | 2/2011 |
| KR | 10-2011-0114790 A | | 10/2011 |
| KR | 10-1338131 B1 | | 12/2013 |
| KR | 10-1341196 B1 | | 12/2013 |
| KR | 10-2014-0026858 A | | 3/2014 |
| KR | 10-2014-0060044 A | | 5/2014 |
| KR | 10-2014-0078966 A | | 6/2014 |
| KR | 10-2014-0098189 A | | 8/2014 |
| KR | 10-2016-0004358 A | | 1/2015 |
| KR | 10-2015-0015918 A | | 2/2015 |
| KR | 10-2016-0043768 A | | 4/2016 |
| KR | 10-2016-0050870 A | | 5/2016 |
| KR | 10-2016-0051574 A | | 5/2016 |
| KR | 10-2016-0134046 A | | 11/2016 |
| KR | 10-2017-0064837 A | | 6/2017 |
| KR | 10-2017-0106125 A | | 8/2017 |
| KR | 10-1830291 B1 | | 2/2018 |
| KR | 10-2019-0026530 A | | 3/2019 |
| KR | 20190026530 A | * | 3/2019 |
| KR | 10-2019-0052249 A | | 5/2019 |
| WO | WO 2013/154623 A1 | | 10/2013 |

OTHER PUBLICATIONS

Extended European Search Report for European Application No. 20809637.0, dated Mar. 10, 2022.

* cited by examiner

SEPARATOR FOR ELECTROCHEMICAL DEVICE AND ELECTROCHEMICAL DEVICE COMPRISING THE SAME

TECHNICAL FIELD

The present disclosure relates to a separator for an electrochemical device and an electrochemical device comprising the same.

The present application claims the benefit of Korean Patent Application No. 10-2019-0057654 filed on May 17, 2019 with the Korean Intellectual Property Office, the disclosure of which is incorporated herein by reference in its entirety.

BACKGROUND ART

Recently, there has been an increasing interest in energy storage technology. As the application field of energy storage technology has been extended to mobile phones, camcorders, laptop computers, and even electric cars, many efforts have been devoted to studying and developing electrochemical devices. In this aspect, electrochemical devices are attracting a great deal of attention, and especially, development of rechargeable secondary batteries is the focus of attention, and more recently, in the development of such batteries, new electrode and battery design for improving the capacity density and specific energy have been studied and developed.

In currently available secondary batteries, lithium secondary batteries developed in early 1990's have much higher operating voltage and energy density than traditional batteries using aqueous electrolyte solutions such as Ni-MH, Ni—Cd, lead-acid batteries, and by virtue of these advantages, lithium secondary batteries are gaining much attention.

In the lithium secondary battery, the separator interposed between the positive electrode and the negative electrode physically separates the positive electrode from the negative electrode to prevent short circuits caused by the direct contact of the positive electrode and the negative electrode.

The separator predominantly affects the internal resistance of an electrode assembly. Accordingly, to reduce the internal resistance of the electrode assembly, it is effective to reduce the resistance of the separator.

Most of separators used in lithium secondary batteries have an organic/inorganic porous coating layer comprising inorganic particles and a binder polymer on a porous polymer substrate.

The porous coating layer may be formed by coating a porous coating layer-forming slurry comprising the inorganic particles and the binder polymer to the porous polymer substrate and drying the slurry, and in this instance, the pores of the porous polymer substrate may be clogged with the porous coating layer-forming slurry, resulting in a decrease in ionic conductivity.

DISCLOSURE

Technical Problem

An embodiment of the present disclosure is directed to providing a separator for an electrochemical device with high ionic conductivity, an increased peel strength between a porous polymer substrate and a porous coating layer, and improved capacity retention vs cycle number, and an electrochemical device comprising the same.

It will be appreciated that these and other objects and advantages of the present disclosure may be realized by means or methods described in the appended claims and a combination thereof.

Technical Solution

An aspect of the present disclosure provides a separator for an electrochemical device according to the following embodiments.

A first embodiment relates to a separator for an electrochemical device comprising a porous polymer substrate, and a porous coating layer formed on at least one surface of the porous polymer substrate, the porous coating layer comprising inorganic particles and an ion conducting polymer, wherein the ion conducting polymer comprises a fluorine-based copolymer containing fluoroolefin-based segments with anionic functional groups present in side chains or terminals of the copolymer.

A second embodiment relates to the separator for an electrochemical device according to the first embodiment, wherein the anionic functional groups comprise at least one of —$SO_3H$, —COOH, —PhOH, —$ArSO_3H$, or —$NH_2$.

A third embodiment relates to the separator for an electrochemical device according to any one of the preceding embodiments, wherein the fluorine-based copolymer containing fluoroolefin-based segments with anionic functional groups introduced into side chains or terminals has an ionic conductivity of $0.1 \times 10^{-4}$ S/cm to $99 \times 10^{-4}$ S/cm.

A fourth embodiment relates to the separator for an electrochemical device according to any one of the preceding embodiments, wherein the fluorine-based copolymer comprises at least one of an tetrafluoroethylene-based fluorine-based copolymer, an ethylene tetrafluoroethylene-based fluorine-based copolymer, a vinyl fluoride-based fluorine-based copolymer, a vinylidene fluoride-based fluorine-based copolymer, a hexafluoropropylene-based fluorine-based copolymer, a chlorotrifluoroethylene-based fluorine-based copolymer, or a perfluoro(propyl vinyl ether)-based fluorine-based copolymer.

A fifth embodiment relates to the separator for an electrochemical device according to any one of the preceding embodiments, wherein the fluorine-based copolymer containing fluoroolefin-based segments with anionic functional groups introduced into side chains or terminals comprises at least one of a sulfonated tetrafluoroethylene-based fluorine-based copolymer, a sulfonated ethylene tetrafluoroethylene-based fluorine-based copolymer, a sulfonated vinyl fluoride-based fluorine-based copolymer, a sulfonated vinylidene fluoride-based fluorine-based copolymer, a sulfonated hexafluoropropylene-based fluorine-based copolymer, a sulfonated chlorotrifluoroethylene-based fluorine-based copolymer, or a sulfonated perfluoro(propyl vinyl ether)-based fluorine-based copolymer.

A sixth embodiment relates to the separator for an electrochemical device according to the fifth embodiment, wherein the sulfonated tetrafluoroethylene-based fluorine-based copolymer is represented by the following chemical formula 1:

[Chemical formula 1]

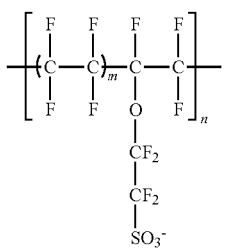

where each of the m and the n is independently an integer of 1 to 32.

A seventh embodiment relates to the separator for an electrochemical device according to any one of the preceding embodiments, wherein a volume ratio of the inorganic particles to the ion conducting polymer is 99:1 to 1:99.

An eighth embodiment relates to the separator for an electrochemical device according to any one of the preceding embodiments, wherein the porous coating layer has porosity of 0 to 20%, and a pore size of 0 to 200 nm.

A ninth embodiment relates to the separator for an electrochemical device according to any one of the preceding embodiments, wherein the fluorine-based copolymer containing fluoroolefin-based segments with anionic functional groups introduced into side chains or terminals has an ionic conductivity of $1\times10^{-4}$ S/cm to $99\times10^{-4}$ S/cm.

A tenth embodiment relates to the separator for an electrochemical device according to any one of the preceding embodiments, wherein a peel strength between the porous polymer substrate and the porous coating layer is 30 gf/15 mm to 150 gf/15 mm.

An eleventh embodiment relates to the separator for an electrochemical device according to any one of the preceding embodiments, wherein a volume ratio of the inorganic particles to the ion conducting polymer is 50:50 to 1:99.

A twelfth embodiment relates to the separator for an electrochemical device according to any one of the preceding embodiments, wherein the separator has an ionic conductivity of $9\times10^{-4}$ S/cm to $99\times10^{-4}$ S/cm.

Another aspect of the present disclosure provides an electrochemical device according to the following embodiments.

A thirteenth embodiment relates to an electrochemical device comprising a positive electrode, a negative electrode and a separator interposed between the positive electrode and the negative electrode, wherein the separator is defined in any one of the preceding embodiments.

A fourteenth embodiment relates to the electrochemical device according to the thirteenth embodiment, wherein the electrochemical device is a lithium secondary battery.

Advantageous Effects

The separator according to an embodiment of the present disclosure has high ionic conductivity and an increased peel strength between the porous polymer substrate and the porous coating layer.

Accordingly, it is possible to provide an electrochemical device with improved capacity retention vs cycle number.

DETAILED DESCRIPTION

Hereinafter, the present disclosure will be described in detail. It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

It will be further understood that when an element is referred to as being ⌈connected to⌋ another element, it can be ⌈directly connected to⌋ the other element or intervening elements may be present. Additionally, the connection covers physical connection as well as electrochemical connection.

The term ⌈comprises⌋ when used in this specification, specifies the presence of stated elements, but does not preclude the presence or addition of one or more other elements, unless the context clearly indicates otherwise.

Additionally, ⌈comprise⌋ and/or ⌈comprising⌋ when used in this specification, specifies the presence of stated features, integers, steps, operations, elements, components and/or groups thereof, but does not preclude the presence or addition of one or more other features, integers, operations, elements, components, and/or groups thereof.

It will be understood that ⌈about⌋ and ⌈substantially⌋ are used herein in the sense of at, or nearly at, when given the manufacturing and material tolerances inherent in the stated circumstances and are used to prevent the unscrupulous infringer from unfairly taking advantage of the disclosure where exact or absolute figures are stated as an aid to understanding the present disclosure.

It will be further understood that ⌈combination(s) thereof⌋ in Markush type language as used herein, refers to a mixture or combination of one or more selected from the group consisting of elements stated in Markush type language, and specifies the inclusion of one or more selected from the group consisting of the elements.

⌈A and/or B⌋ when used in this specification, specifies ⌈either A or B or both⌋.

Hereinafter, the present disclosure will be described in detail.

An aspect of the present disclosure relates to a separator for an electrochemical device and an electrochemical device comprising the same.

The conventional separator for an electrochemical device comprises a porous polymer substrate and a porous coating layer comprising inorganic particles and a binder polymer on the porous polymer substrate.

However, the separator has low ionic conductivity due to the clogging of the pores of the porous polymer substrate with a porous coating layer-forming slurry in the process of forming the porous coating layer on the porous polymer substrate.

To solve the above-described problem, an aspect of the present disclosure is directed to providing a separator suitable for use in an electrochemical device, with high ionic conductivity and an increased peel strength between the porous polymer substrate and the porous coating layer and an electrochemical device comprising the same.

An aspect of the present disclosure relates to a separator for an electrochemical device, comprising:
  a porous polymer substrate; and
  a porous coating layer formed on at least one surface of the porous polymer substrate, the porous coating layer comprising inorganic particles and an ion conducting polymer,
  wherein the ion conducting polymer comprises a fluorine-based copolymer containing fluoroolefin-based segments with anionic functional groups introduced into the side chains or terminals of the copolymer.

In the separator according to an aspect of the present disclosure, the porous coating layer comprises the ion conducting polymer.

The ion conducting polymer has adhesive properties, and connects and immobilizes the inorganic particles. The ion conducting polymer has good ability to transport lithium ions.

Due to the inclusion of the ion conducting polymer, the separator according to an aspect of the present disclosure prevents the decreased ionic conductivity caused by the clogging of the pores of the porous polymer substrate with the binder polymer used in the porous coating layer. That is, in the present disclosure, even if the pores of the porous polymer substrate are clogged with the ion conducting polymer, the ion conducting polymer can transport lithium ions. Accordingly, there is no decrease in ionic conductivity of the separator.

In detail, the ion conducting polymer comprises a fluorine-based copolymer containing fluoroolefin-based segments with anionic functional groups introduced into the side chains or terminals.

In this instance, the anionic functional groups may comprise at least one of —$SO_3H$, —COOH, —PhOH, —$ArSO_3H$ (wherein Ar means aryl), or —$NH_2$, and preferably —$SO_3H$ in terms of ionic conductivity.

In this instance, the ionic conductivity of the fluorine-based copolymer containing fluoroolefin-based segments with anionic functional groups introduced into the side chains or terminals may be $0.1 \times 10^{-4}$ S/cm to $99 \times 10^{-4}$ S/cm, or $1 \times 10^{-4}$ S/cm to $99 \times 10^{-4}$ S/cm. Within the above-described range, the separator has the improved ionic conductivity.

In the separator according to an aspect of the present disclosure, the fluorine-based copolymer containing fluoroolefin-based segments with anionic functional groups introduced into the side chains or terminals has not only the above-described ionic conductivity but also adhesive properties.

The inventor found that in the case of the porous coating layer using a fluorine-based copolymer having no anionic functional group at the side chains or terminals, such as polyethylene oxide, adhesion between the porous polymer substrate and the porous coating layer is poor, causing separation of the inorganic particles.

The inventor found that in the case of the porous coating layer using a compound other than a fluorine-based copolymer, such as poly(acrylonitrile), electrochemical side reactions occur, and it is unsuitable for the binder polymer of the porous coating layer.

Additionally, the inventor found that in the case of the porous coating layer using poly(vinylidene fluoride) as the fluorine-based copolymer having no anionic functional group at the side chains or terminals, there is a decrease in ionic conductivity due to the clogging of the pores of the porous polymer substrate with the porous coating layer-forming slurry.

By contrast, the use of the fluorine-based copolymer containing fluoroolefin-based segments with anionic functional groups introduced into the side chains or terminals according to an aspect of the present disclosure makes it possible to manufacture the separator with an increased peel strength and high ionic conductivity. When the anionic functional groups are introduced into the main chain of the fluorine-based copolymer, the fluorine-based copolymer is negatively charged, causing lithium cations to move. Additionally, the fluorine-based copolymer comprises fluorine atoms, and high bond strength of fluorine atoms having high electronegativity provides electrochemical stability. The inclusion of the fluorine-based copolymer containing fluoroolefin-based segments with anionic functional groups introduced into the side chains or terminals increases the dielectric constant and the peel strength between the porous polymer substrate and the porous coating layer.

That is, in the separator according to an aspect of the present disclosure, the peel strength between the porous polymer substrate and the porous coating layer may be 30 gf/15 mm to 150 gf/15 mm, or 50 gf/15 mm to 80 gf/15 mm, or 60 gf/15 mm to 70 gf/15 mm. Within the above-described range, separation of the inorganic particles in the porous coating layer does not occur, resulting in improved ionic conductivity of the separator.

In the separator according to an aspect of the present disclosure, the fluorine-based copolymer may comprise at least one of a tetrafluoroethylene-based fluorine-based copolymer, an ethylene tetrafluoroethylene-based fluorine-based copolymer, a vinyl fluoride-based fluorine-based copolymer, a vinylidene fluoride-based fluorine-based copolymer, a hexafluoropropylene-based fluorine-based copolymer, a chlorotrifluoroethylene-based fluorine-based copolymer, or a perfluoro(propyl vinyl ether)-based fluorine-based copolymer.

In this instance, the anionic functional groups may comprise at least one of —$SO_3H$, —COOH, —PhOH, —$ArSO_3H$, or —$NH_2$, and preferably —$SO_3H$ in terms of ionic conductivity.

For example, the fluorine-based copolymer containing fluoroolefin-based segments with anionic functional groups introduced into the side chains or terminals may comprise at least one of a sulfonated tetrafluoroethylene-based fluorine-based copolymer, a sulfonated ethylene tetrafluoroethylene-based fluorine-based copolymer, a sulfonated vinyl fluoride-based fluorine-based copolymer, a sulfonated vinylidene fluoride-based fluorine-based copolymer, a sulfonated hexafluoropropylene-based fluorine-based copolymer, a sulfonated chlorotrifluoroethylene-based fluorine-based copolymer, or a sulfonated perfluoro(propyl vinyl ether)-based fluorine-based copolymer.

For example, the sulfonated tetrafluoroethylene-based fluorine-based copolymer may be represented by chemical formula 1:

[Chemical formula 1]

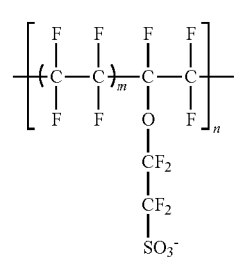

In chemical formula 1, each of the m and the n is independently an integer of 1 to 32.

For example, the sulfonated tetrafluoroethylene-based fluorine-based copolymer may comprise a perfluorosulfonate-based polymer electrolyte, to be specific, Nafion ($C_7HF_{13}O_5SC_2F_4$).

In a particular embodiment of the present disclosure, the porosity of the porous coating layer may be 0 to 20%, 0 to 10%, or 0 to 5%. In a particular embodiment of the present disclosure, the pore size of the porous coating layer may be 0 to 200 nm, or 0 to 100 nm, or 0 to 30 nm. With the above-described porosity and pore size, the separator according to an aspect of the present disclosure has good mechanical strength, and at the same time, the separator has a small pore size and low porosity but high ionic conductivity.

That is, since the ion conducting polymer is used as described above, the present disclosure may provide the separator having high ionic conductivity even if there is no pore in the porous coating layer.

In a particular embodiment of the present disclosure, the ionic conductivity of the separator may be $9 \times 10^{-4}$ S/cm to $99 \times 10^{-4}$ S/cm, or $12 \times 10^{-4}$ S/cm to $99 \times 10^{-4}$ S/cm, or $12 \times 10^{-4}$ S/cm to $50 \times 10^{-4}$ S/cm. Accordingly, it is possible to provide an electrochemical device having long life and low resistance.

Although not particularly limited, the thickness of the porous coating layer may be specifically 1 to 10 μm, and more specifically 1.5 to 6 μm.

In addition to the inorganic particles and the binder polymer as the component of the porous coating layer as described above, the separator according to an aspect of the present disclosure may further comprise an additive.

In a particular embodiment of the present disclosure, the inorganic particles are not limited to a particular type and may include any type of inorganic particle that is electrochemically stable. That is, the inorganic particles that may be used in the present disclosure are not limited to a particular type and may include any type of inorganic particle that does not cause oxidation and/or reduction reactions in the operating voltage range (for example, 0 to 5V versus Li/Li+) of the electrochemical device used. In particular, the use of inorganic particles of high dielectric constants as the inorganic particles contributes to the increased degree of dissociation of an electrolyte salt, for example, a lithium salt, in a liquid electrolyte, thereby improving the ionic conductivity of an electrolyte solution.

By the above-described reasons, the inorganic particles may include at least one of inorganic particles having the dielectric constant of 5 or more, or inorganic particles capable of transporting lithium ions.

The inorganic particles having the dielectric constant of 5 or more may include at least one selected from the group consisting of $Al_2O_3$, $SiO_2$, $ZrO_2$, $AlO(OH)$, $TiO_2$, $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO and SiC.

The inorganic particles capable of transporting lithium ions may include at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$).

Additionally, although not particularly limited, the average particle size of the inorganic particles preferably ranges between 0.001 and 10 μm for the coating layer of a uniform thickness and appropriate porosity. When the average particle size is smaller than 0.001 am, dispersion may be reduced, and when the average particle size is larger than 10 am, the thickness of the coating layer may increase.

The volume ratio of the inorganic particles and the ion conducting polymer may be 1:99 to 99:1. When the volume ratio of the inorganic particles to the ion conducting polymer satisfies the above-described range, there is a safety improvement effect due to the endothermal characteristics of the inorganic particles.

Particularly, in the volume ratio of the inorganic particles and the ion conducting polymer, when the amount of the inorganic particles is smaller than the amount of the ion conducting polymer, there is a decrease in pore size of the porous polymer substrate.

Accordingly, it is possible to physically suppress short circuits caused by metal or lithium dendrites more effectively. In this instance, the volume ratio of the inorganic particles and the ion conducting polymer may be 50:50 to 1:99, and more specifically, 50:50 to 10:90. That is, the volume of the inorganic particles may be equal to the volume of the ion conducting polymer, or the volume of the ion conducting polymer may be larger than the volume of the inorganic particles.

In a particular embodiment of the present disclosure, the porous coating layer may be formed on one or two surfaces of the porous polymer substrate.

In the present disclosure, the porous polymer substrate is a porous film, and may include, without limitation, any type that may be commonly used for separator materials of electrochemical devices to provide channels along which lithium ions move, while preventing short circuits by electrically separating the negative electrode and the positive electrode.

In detail, the porous polymer substrate may be a porous polymer film substrate or a porous polymer nonwoven substrate.

The porous polymer film substrate may be a porous polymer film of polyolefin such as polyethylene, polypropylene, polybutene and polypentene, and the polyolefin porous polymer film substrate exhibits a shutdown function, for example, at the temperature of 800 to 1300.

In this instance, the polyolefin porous polymer film substrate may be made of polyolefin-based polymer including polyethylene such as high density polyethylene, linear low density polyethylene, low density polyethylene and ultra high molecular weight polyethylene, polypropylene, polybutylene and polypentene, used singly or in combination.

Additionally, in addition to the above-described polyolefin, the porous polymer film substrate may be formed in the shape of a film using various types of polymers such as polyester. Additionally, the porous polymer film substrate may be formed by stacking two or more film layers, and each film layer may be formed from polymer such as polyolefin and polyester described above, used singly or in combination.

Additionally, in addition to the polyolefin-based polymer, the porous polymer film substrate and the porous nonwoven substrate may be formed from at least one of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, or polyethylenenaphthalene.

Although not particularly limited, the thickness of the porous polymer substrate is specifically 1 to 100 am, more specifically 5 to 50 μm, and with the recent movement towards higher output/higher capacity of batteries, using the porous polymer substrate of a thin film is advantageous. The pore diameter of the porous polymer substrate may be 10 nm to 100 nm, or 10 nm to 70 nm, or 10 nm to 50 nm, or 10 nm to 35 nm, and the porosity may be 5% to 90%, and preferably 20% to 80%. However, in the present disclosure, these ranges may be subject to change depending on specific embodiments or necessity.

The pores of the porous polymer substrate have many types of pore structures, and it falls within the present disclosure when any of the average pore size measured using a porosimeter and the average pore size observed on Field Emission Scanning Electron Microscope (FE-SEM) satisfies the above condition.

Here, a commonly known uniaxially-oriented dry separator is on the basis of the pore size at the center in the traverse direction (TD), not in the machine direction (MD), on FE-SEM, and a porous polymer substrate of mesh structure (for example, a wet PE separator) is on the basis of the pore size measured using a porosimeter.

The separator according to an aspect of the present disclosure may be manufactured by the following method. However, the present disclosure is not limited thereto.

First, the method may comprise:
(S1) preparing a porous coating layer-forming slurry in which inorganic particles are dispersed and an ion conducting polymer is dissolved in a solvent; and
(S2) coating the porous coating layer-forming slurry on at least one surface of a porous polymer substrate and drying the slurry to form a porous coating layer.

First, an ion conducting polymer solution containing an ion conducting polymer dissolved in a solvent is prepared.

In a particular embodiment of the present disclosure, the solvent may comprise at least one of acetonitrile, dimethyl formamide, dimethyl sulfoxide, N-methyl-2-pyrrolidone, methylethylketone, or cyclohexane.

Subsequently, inorganic particles are put and dispersed in the ion conducting polymer solution to prepare a porous coating layer-forming slurry containing the inorganic particles dispersed therein. After the inorganic particles are pulverized to have a predetermined diameter, the inorganic particles may be added to the ion conducting polymer solution. Alternatively, after the inorganic particles are added to the ion conducting polymer solution, the inorganic particles may be pulverized with controlling the diameter such that they have a predetermined diameter using the ball mill method and dispersed.

The inorganic particles and the ion conducting polymer are the same as described above.

Subsequently, the porous coating layer-forming slurry is coated on at least one surface of the porous polymer substrate and dried to form a porous coating layer (S2).

Although not limited to a particular type, the method for coating the porous coating layer-forming slurry on the porous polymer substrate preferably includes a slot coating method or a dip coating method. The slot coating involves coating a composition supplied through a slot die onto the front surface of the substrate, and may control the thickness of the coating layer according to the flow rate supplied from a constant volume pump. Additionally, the dip coating is a coating method including dipping the substrate in a tank containing a composition, and may control the thickness of the coting layer according to the concentration of the composition and the speed at which the substrate is taken out of the composition tank, and for more accurate control of the coating thickness, after dipping, measurement may be performed through a Meyer bar.

The porous polymer substrate coated with the porous coating layer-forming slurry is dried using a dryer such as an oven to form the porous coating layer on at least one surface of the porous polymer substrate.

In the porous coating layer, the inorganic particles are packed in contact such that the inorganic particles are bonded by the ion conducting polymer, forming interstitial volumes therebetween, and the interstitial volumes are empty spaces that are to be pores.

That is, the ion conducting polymer may bind the inorganic particles to hold them together, and for example, the ion conducting polymer may adhere and immobilize the inorganic particles. Additionally, interstitial volumes between the inorganic particles are empty spaces that are to be the pores of the porous coating layer, and may be spaces defined by the inorganic particles substantially in surface contact in the closely packed or densely packed structure by the inorganic particles.

The drying may be performed in a drying chamber, and in this instance, the condition of the drying chamber is not particularly limited due to non-solvent coating.

An electrochemical device according to an aspect of the present disclosure comprises a positive electrode, a negative electrode and a separator interposed between the positive electrode and the negative electrode, and the separator is the above-described separator according to an aspect of the present disclosure.

The electrochemical device may include any type of device using electrochemical reactions, and as a specific example, may include primary and secondary batteries, fuel cells, solar cells or capacitors such as super capacitors. In particular, among the secondary batteries, lithium secondary batteries including lithium metal secondary batteries, lithium ion secondary batteries, lithium polymer secondary batteries or lithium ion polymer secondary batteries are desirable.

The positive and negative electrodes to be used with the separator of the present disclosure are not limited to a particular type, and may be manufactured by binding an electrode active material to an electrode current collector by a common method known in the technical field pertaining to the present disclosure. Of the electrode active material, non-limiting examples of the positive electrode active material may include general positive electrode active materials commonly used in positive electrodes of electrochemical devices, and preferably include lithium manganese oxide, lithium cobalt oxide, lithium nickel oxide, lithium iron oxide or their lithium composite oxide. Non-limiting examples of the negative electrode active material may include general negative electrode active materials commonly used in negative electrodes of electrochemical devices, and preferably include lithium adsorption materials such as lithium metal or lithium alloy, carbon, petroleum coke, activated carbon, graphite or other carbons. Non-limiting examples of the positive electrode current collector may include a foil made from aluminum, nickel or a combination thereof, and non-limiting examples of the negative electrode current collector may include a foil made from copper, gold, nickel or copper alloy or a combination thereof.

An electrolyte solution, which may be used in the electrochemical device of the present disclosure, includes, but is not limited to, electrolyte solutions in which a salt is dissolved or dissociated in an organic solvent, the salt having a structure represented by, for example, $A^+B^-$, wherein $A^+$ is an alkali metal cation such as $Li^+$, $Na^+$, $K^+$ or a combination thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the organic solvent including at least one of propylene carbonate (PC), ethylene carbonate (EC), diethylcarbonate (DEC), dimethylcarbonate (DMC), dipropylcarbonate (DPC), dimethyl sulfoxide, acetonitrile, dimethoxyethane, diethoxyethane, tetrahydrofuran, N-methyl-2-pyrrolidone (NMP), ethylmethylcarbonate (EMC), or γ-butyrolactone.

The injection of the electrolyte solution may be performed in any suitable step of a battery manufacturing process according to a manufacturing process and required properties of a final product. That is, the injection of the electrolyte solution may be applied before battery assembly or in the final step of battery assembly.

The electrochemical device according to an aspect of the present disclosure has high capacity retention with the increasing cycle number due to the use of the separator comprising the ion conducting polymer.

In detail, when the capacity retention is measured under a predetermined condition, the electrochemical device has 80% capacity retention in 100 cycles or more.

Hereinafter, the present disclosure will be described in detail through examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

Example 1

$Al_2O_3$ inorganic particles (Nippon Light Metal, LS235, particle size 500 nm), Nafion ($C_7HF_{13}O_5SC_2F_4$) as an ion conducting polymer are added to a solvent N-methyl-2-pyrrolidone and stirred at room temperature to prepare a homogeneous porous coating layer-forming slurry. A volume ratio of the inorganic particles and the ion conducting polymer in the slurry is 50:50.

The slurry is coated on two surfaces of a polyethylene porous substrate (W scope, WL11B, air permeation time 150 sec/100 cc) by dip coating and dried to manufacture a separator having a porous coating layer. The porous coating layer is 4 μm in thickness.

Example 2

A separator is manufactured by the same method as example 1 except that the volume ratio of the inorganic particles and the ion conducting polymer is controlled to 30:70.

Example 3

A separator is manufactured by the same method as example 1 except that the volume ratio of the inorganic particles and the ion conducting polymer is controlled to 10:90.

Comparative Example 1

$Al_2O_3$ inorganic particles (Nippon Light Metal, LS235, particle size 500 nm) and polyvinylidene fluoride (PVDF) as a binder polymer are added to a solvent N-methyl-2-pyrrolidone and stirred at room temperature to prepare a homogeneous porous coating layer-forming slurry. A volume ratio of the inorganic particles and the binder polymer in the slurry is 80:20.

The slurry is coated on two surfaces of a polyethylene porous substrate (W scope, WL11B, air permeation time 150 sec/100 cc) by dip coating and dried to manufacture a separator having a porous coating layer. The porous coating layer is 4 μm in thickness.

TABLE 1

| Classification | Ionic conductivity of separator (S/cm) | Discharge capacity at 0.1 C rate (mAh) | 80% capacity retention vs cycle number | Porosity of porous coating layer (%) | Pore size of porous coating layer (nm) | Measured peel strength (gf/15 mm) |
|---|---|---|---|---|---|---|
| Example 1 | $12 \times 10^{-4}$ | 123 | 105 | 10 | 25 | 60 |
| Example 2 | $19 \times 10^{-4}$ | 124 | 120 | 5 | 20 | 65 |
| Example 3 | $19 \times 10^{-4}$ | 124 | 120 | 2 | 10 | 70 |
| Comparative example 1 | $5 \times 10^{-4}$ | 120 | 60 | 50 | 200 | 60 |

Evaluation Results

The details of the evaluation method are as below.
(1) Thickness Measurement Method The thickness of the separator is measured using a thickness measurement instrument (Mitutoyo, VL-50S-B).
(2) Pore Size Measurement Method of Porous Coating Layer The pore size is measured by $N_2$ adsorption using SOLETEX BELSORP-miniX.
(3) Porosity Measurement Method of Porous Coating Layer The true density, thickness, and mass of the separator having the porous coating layer is measured, and porosity is calculated according to the following Equation 1.

$$\text{Porosity (\%)} = (1 - (\text{measured density of separator having porous coating layer}/\text{theoretic density of separator having porous coating layer})) \times 100 \quad [\text{Equation 1}]$$

(4) Ionic Conductivity Measurement

Each separator of examples 1 to 3 and comparative example 1 is cut into a round shape (area: 1.7671 cm²), and interposed between two sheets of stainless steel (SUS) to manufacture a coin cell. Electrochemical Impedance Spectroscopy is performed using an analyzer (VMP3, Bio logic science instrument) at 60□ under the condition of amplitude 10 mV and scan range 10 Khz to 100 KHz, ionic conductivity is calculated based on the analysis, and the results are shown in Table 1.
(5) Peel Strength Between Porous Coating Layer and Porous Substrate Each separator manufactured in examples and comparative example is tailored into the size of 15 mm×100 mm. A double-sided adhesive tape is attached to a glass, and the surface of the porous coating layer of the separator is adhered to the adhesive tape. Subsequently, an end of the adhered separator is placed on a universal testing machine (UTM) (LLOYD Instrument LF Plus), a force is applied at the angle of 180° and the speed of 300 mm/min, and the peeling force required to separate the porous coating layer from the porous polymer substrate is measured.

(6) Capacity Retention Measurement

To measure the capacity retention, an electrochemical device is manufactured as below.

1) Manufacture of Negative Electrode

A rectangular (thickness: 10 μm) copper current collector having the cross-sectional area of 17 cm² is used for a negative electrode (Li free anode).

2) Manufacture of Positive Electrode

A positive electrode active material (LiCoO$_2$), a conductive material (carbon black) and a binder (PVDF) are added to N-methyl-2-pyrrolidone (NMP) at a weight ratio of 96:2:2 and mixed together to prepare a positive electrode slurry, and the prepared positive electrode slurry is coated on a 20 μm thick aluminum foil as a positive electrode current collector with the capacity of 3.1 mAh/cm² to manufacture a positive electrode.

3) Adhesion of Separator and Electrode

Subsequently, the positive electrode and the negative electrode is roll pressed at 90□, 8.5 MPa for 1 sec with the separator interposed between the positive electrode and the negative electrode, to manufacture an electrode assembly in which the electrode and the separator are stacked.

The electrode assembly comprising the separator of example and comparative example is put inside a case, followed by injection of 3.5M LiFSI in EMC:FEC (7:3 vol %) electrolyte solution.

Subsequently, the electrode assembly is charged in CC-CV at 0.1 C up to 4.25V in the room temperature condition and discharged with the constant current at 0.5 C up to 3V, and after repeated 200 cycles, capacity retention is measured.

(7) Discharge Capacity Measurement Method

The electrode assembly is charged in CC-CV at 0.1 C up to 4.25V under the room temperature condition and discharged with the constant current at 0.1 C up to 3V, and discharge capacity is measured.

As shown in Table 1, it can be seen that the separators of examples 1 to 3 according to an aspect of the present disclosure show ionic conductivity about twice or three times higher than comparative example 1. Additionally, it can be seen that the peel strength between the porous polymer substrate and the porous coating layer is also kept high. Particularly, the electrochemical device using the separator according to an aspect of the present disclosure shows capacity retention that is about twice higher than comparative example 1.

It can be seen that the separator according to an aspect of the present disclosure shows higher peel strength, ionic conductivity and capacity retention as the volume of the ion conducting polymer is higher than the volume of the inorganic particles. This is because fluorine atoms bonded to the main chain of the fluorine-based copolymer have high electronegativity and relatively high bond strength and thus are electrochemically stable, resulting in side reaction reduction. Additionally, this is because anionic functional groups are introduced into the side chains or terminals of the fluorine-based copolymer, and thus the fluorine-based copolymer itself is negatively charged, causing cations lithium ions to move, contributing to increased ionic conductivity and dielectric constant. Additionally, this is because the use of the fluorine-based copolymer increases the peel strength between the porous polymer substrate and the porous coating layer.

In contrast, comparative example 1 shows a large pore size and high porosity in the porous coating layer, but lower ionic conductivity and capacity retention than an embodiment of the present disclosure.

What is claimed is:

1. A separator for an electrochemical device, comprising:
   a porous polymer substrate; and
   a porous coating layer on at least one surface of the porous polymer substrate,
   wherein the porous coating layer comprises Inorganic particles and an ion conducting polymer, and
   wherein the ion conducting polymer comprises a fluorine-based copolymer comprising fluoroolefin-based segments with anionic functional groups present in side chains or terminals of the copolymer,
   wherein a volume ratio of the inorganic particles to the ion conducting polymer is 50:50 to 1:99,
   wherein the separator has an ionic conductivity of $12 \times 10^{-4}$ S/cm to $99 \times 10^{-4}$ S/cm, and
   the porous coating layer has a thickness of 1.5 to 6 μm, a porosity of 2 to 10%, and a pore size of 10 to 25 nm.

2. The separator for an electrochemical device according to claim 1, wherein the anionic functional groups comprise at least one of —SO$_3^-$, —COO$^-$, —PhO$^-$, —ArSO$_3^-$, or —NH$^-$.

3. The separator for an electrochemical device according to claim 1, wherein the fluorine-based copolymer has an ionic conductivity of $0.1 \times 10^{-4}$ S/cm to $99 \times 10^{-4}$ S/cm.

4. The separator for an electrochemical device according to claim 1, wherein the fluorine-based copolymer comprises at least one of an tetrafluoroethylene-based fluorine-based copolymer, an ethylene tetrafluoroethylene-based fluorine-based copolymer, a vinyl fluoride-based fluorine-based copolymer, a vinylidene fluoride-based fluorine-based copolymer, a hexafluoropropylene-based fluorine-based copolymer, a chlorotrifluoroethylene-based fluorine-based copolymer, or a perfluoro(propyl vinyl ether)-based fluorine-based copolymer.

5. The separator for an electrochemical device according to claim 1, wherein the fluorine-based copolymer comprises at least one of a sulfonated tetrafluoroethylene-based fluorine-based copolymer, a sulfonated ethylene tetrafluoroethylene-based fluorine-based copolymer, a sulfonated vinyl fluoride-based fluorine-based copolymer, a sulfonated vinylidene fluoride-based fluorine-based copolymer, a sulfonated hexafluoropropylene-based fluorine-based copolymer, a sulfonated chlorotrifluoroethylene-based fluorine-based copolymer, or a sulfonated perfluoro(propyl vinyl ether)-based fluorine-based copolymer.

6. The separator for an electrochemical device according to claim 5, wherein the sulfonated tetrafluoroethylene-based fluorine-based copolymer is represented by the following chemical formula:

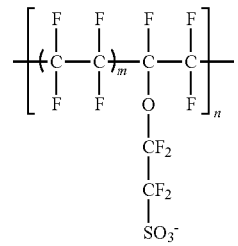

where each of m and n is independently an integer of 1 to 32.

7. The separator for an electrochemical device according to claim 1, wherein the volume ratio of the inorganic particles to the ion conducting polymer is 50:50 to 30:70.

8. The separator for an electrochemical device according to claim 1, wherein the fluorine-based copolymer comprising fluoroolefin-based segments with anionic functional groups present in side chains or terminals has an ionic conductivity of $1\times10^{-4}$ S/cm to $99\times10^{-4}$ S/cm.

9. The separator for an electrochemical device according to claim 1, wherein a peel strength between the porous polymer substrate and the porous coating layer is 30 gf/15 mm to 150 gf/15 mm.

10. The separator for an electrochemical device according to claim 1, wherein the volume ratio of the inorganic particles to the ion conducting polymer is 50:50 to 10:90.

11. An electrochemical device comprising:
a positive electrode;
a negative electrode; and
a separator interposed between the positive electrode and the negative electrode,
wherein the separator is defined in claim 1.

12. The electrochemical device according to claim 11, wherein the electrochemical device is a lithium secondary battery.

13. The separator for an electrochemical device according to claim 1, wherein the ionic conductivity of the separator is $12\times10^{-4}$ S/cm to $19\times10^{-4}$ S/cm.

* * * * *